May 3, 1932.  G. FLINTERMANN  1,856,950
ADJUSTABLE SEAT FOR VEHICLES
Filed May 8, 1929   4 Sheets-Sheet 2
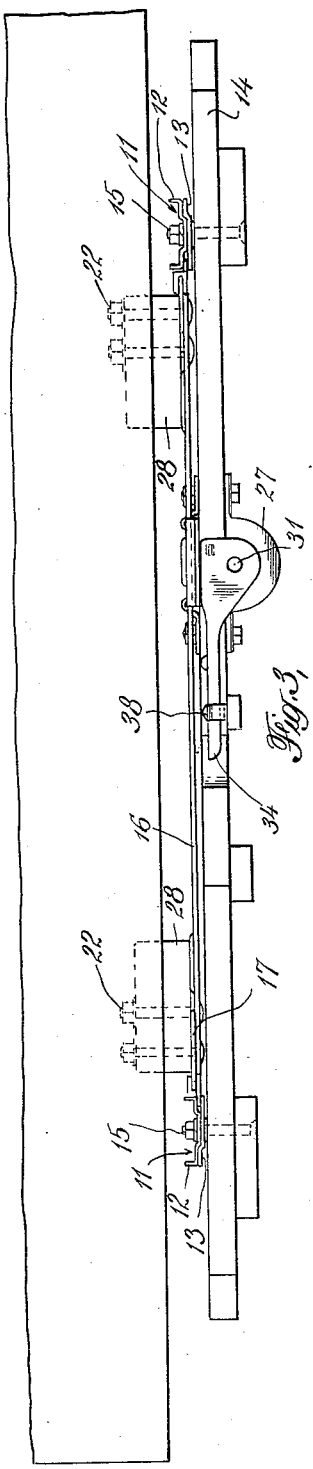
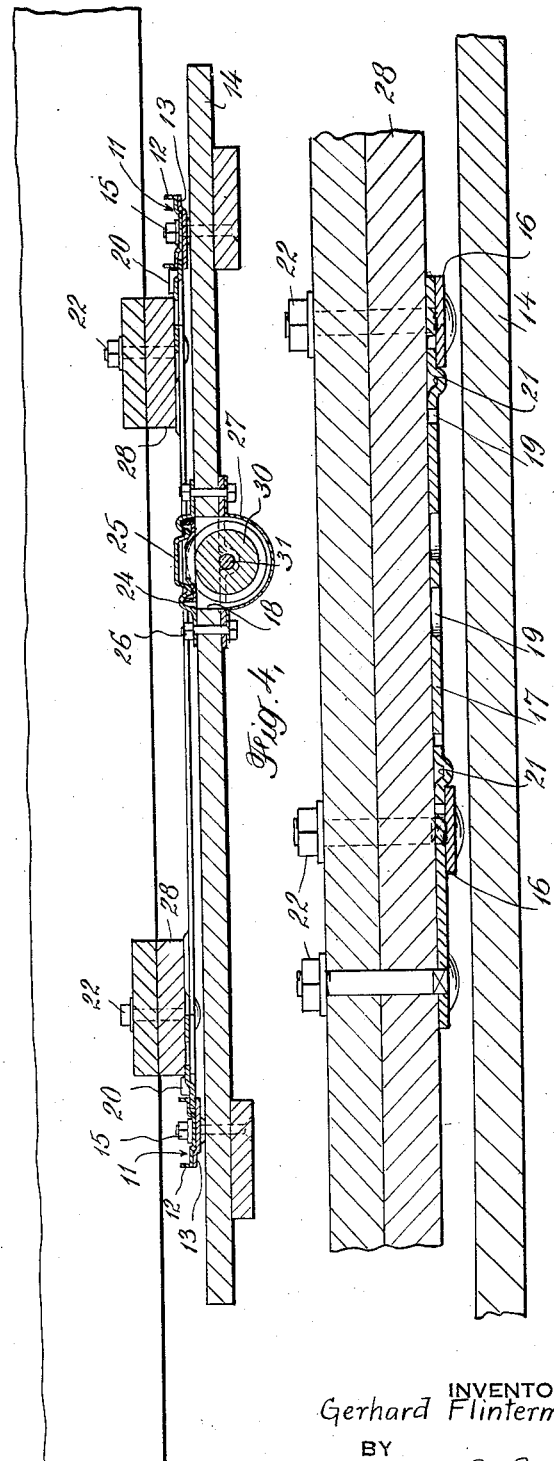
INVENTOR
Gerhard Flintermann
BY
Pennie, Davis, Marvin & Edmonds
HIS ATTORNEYS May 3, 1932. G. FLINTERMANN 1,856,950
ADJUSTABLE SEAT FOR VEHICLES
Filed May 8, 1929 4 Sheets-Sheet 3
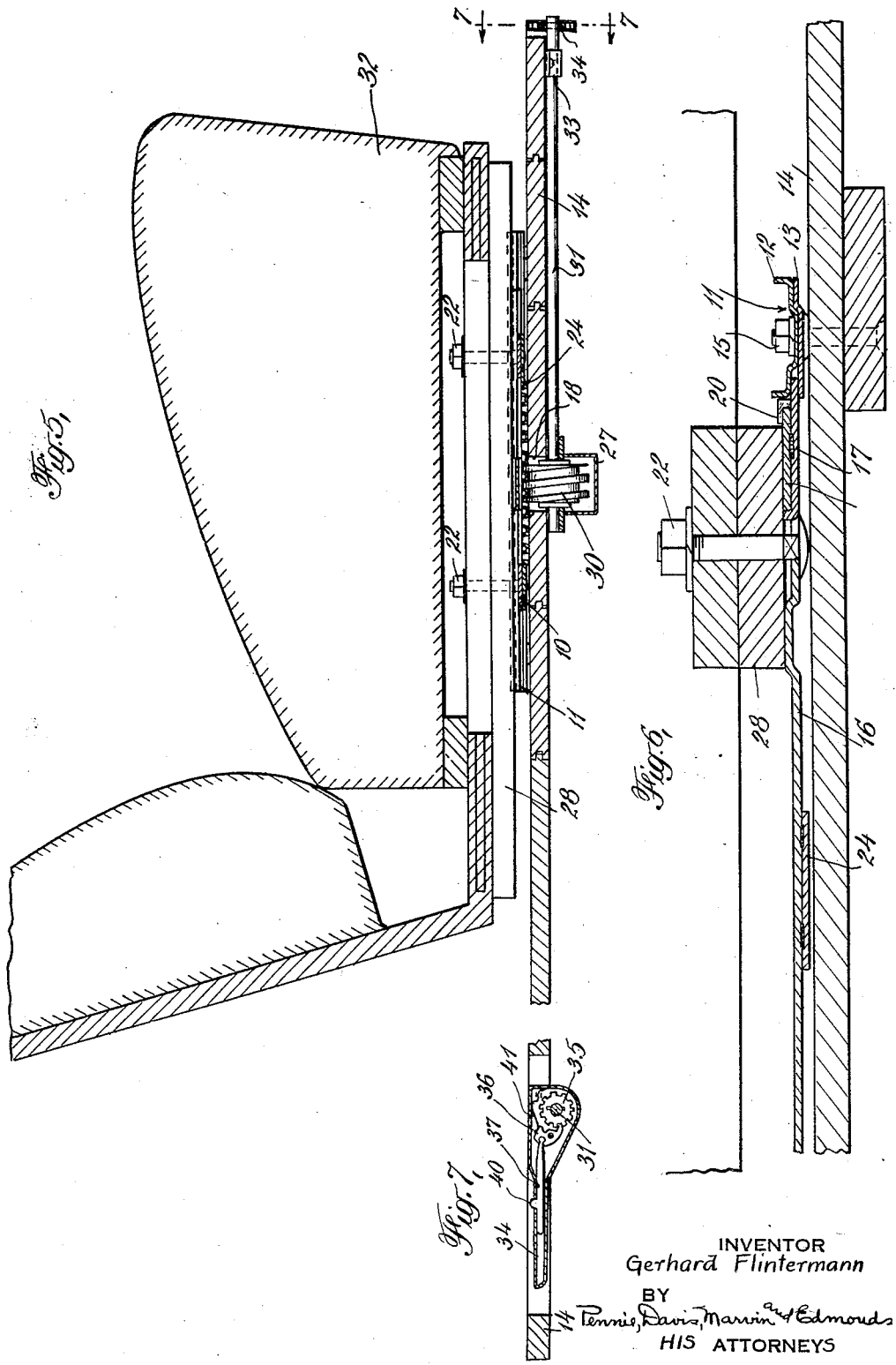
INVENTOR
Gerhard Flintermann
BY
Pennie, Davis, Marvin and Edmonds
HIS ATTORNEYS May 3, 1932.　　G. FLINTERMANN　　1,856,950
ADJUSTABLE SEAT FOR VEHICLES
Filed May 8, 1929　　4 Sheets-Sheet 4
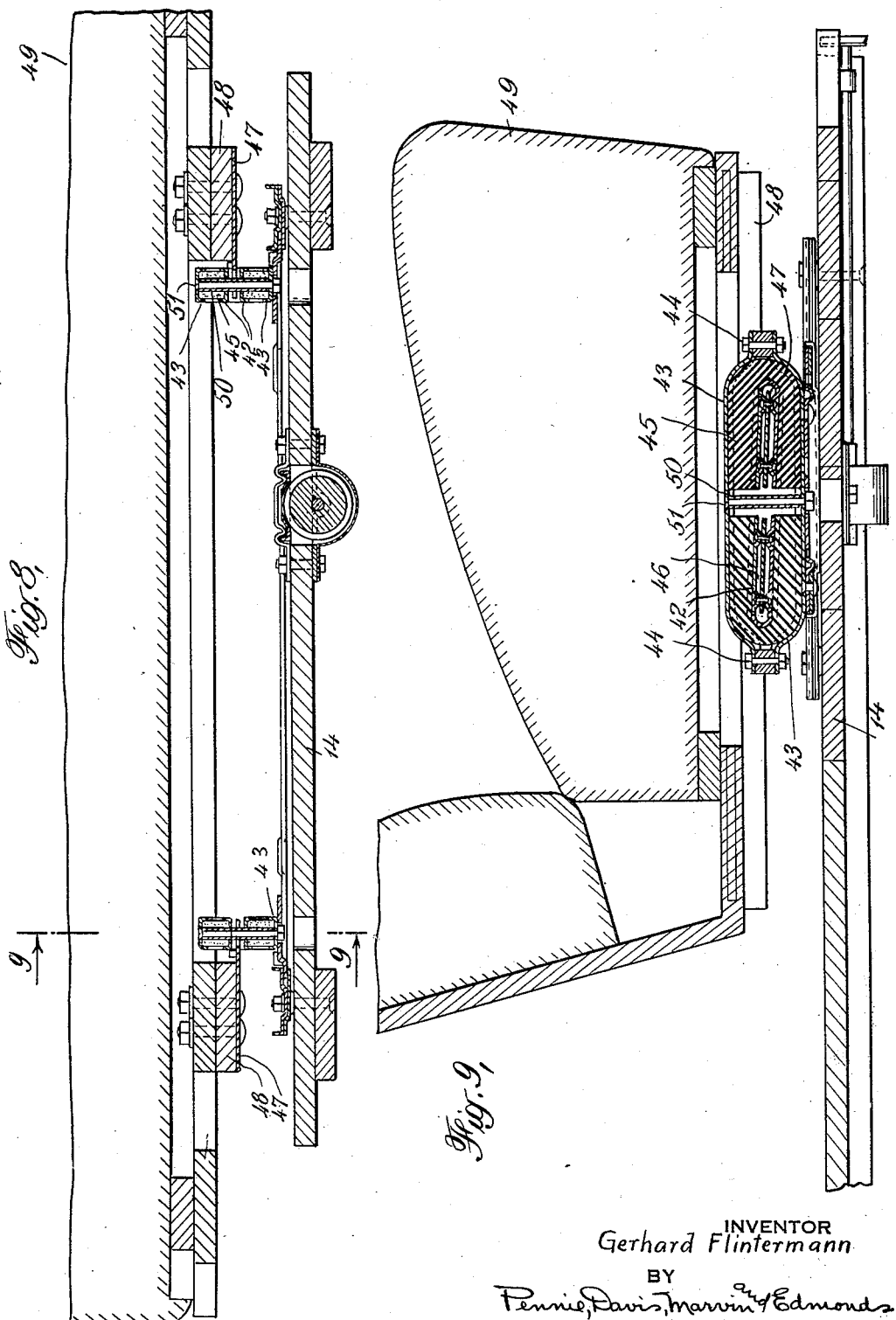
INVENTOR
Gerhard Flintermann
BY
Pennie, Davis, Marvin & Edmonds
HIS ATTORNEYS Patented May 3, 1932

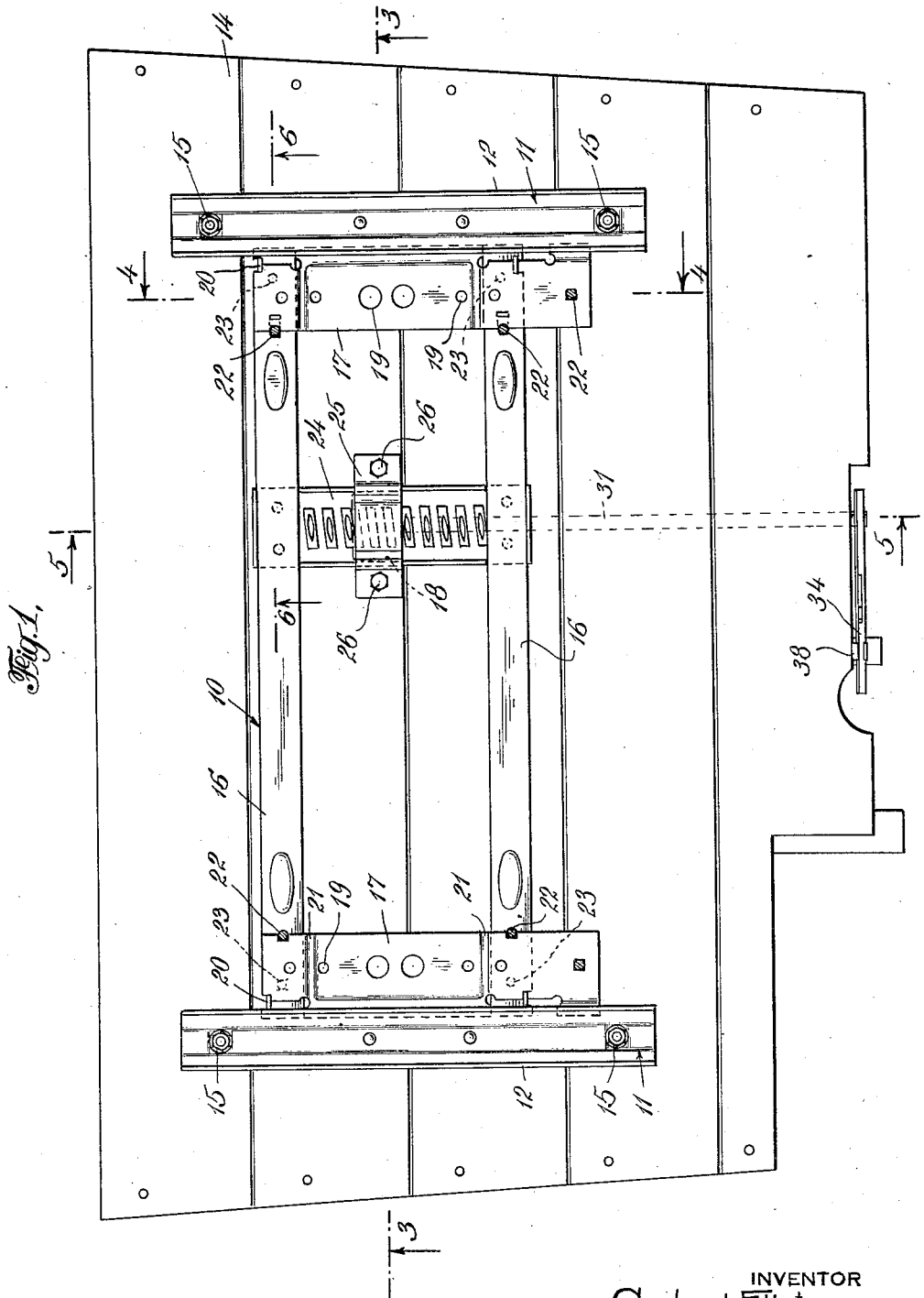

1,856,950

UNITED STATES PATENT OFFICE

GERHARD FLINTERMANN, OF WEST ORANGE, NEW JERSEY

ADJUSTABLE SEAT FOR VEHICLES

Application filed May 8, 1929. Serial No. 361,404.

This invention relates to seats and has for an object the provision of improved means for mounting seats. More particularly, the invention contemplates the provision of improved supporting and adjusting means for seats.

In one of its aspects, the invention is particularly applicable to vehicles in which it is desirable to provide adjustable seats for varying the leg room provided. Thus, the invention provides improved means for adjusting the positions of automobile front seats by moving the seats rearwardly and forwardly, or, in opposite directions longitudinally of the automobile body.

Apparatus embodying the invention comprises a supporting frame mounted for sliding movement in guide members disposed adjacent the opposite ends thereof and attached to a suitable supporting base, and means for moving the supporting frame relatively to the guide members. When the invention is applied to automobiles, the supporting base is preferably a group of floor boards attached together and removable as a unit. The construction and mounting of the guides and frame are such that relatively small contact surfaces are provided and a minimum amount of play is permitted whereby the frame may be easily moved and readily confined to its proper path of travel. The seat proper may be attached directly to the supporting frame, or it may be attached to cushioning members attached to the frame.

In one form of apparatus embodying the invention, a rack is attached to the movable supporting frame in such a manner that it is operatively engaged by a worm rigidly mounted on a shaft supported for rotation in fixed bearings. The worm shaft extends to a convenient point in front of the seat and it is provided adjacent one end with an operating lever. The operating lever is preferably a ratchet mechanism which is so constructed and mounted that its upper edge is flush with or is disposed slightly below the upper surface of the floor board unit to which the frame guides are attached. The worm is restrained against movement away from the rack by means of a metal strip which extends over and serves as a guide for the rack.

The invention will be better understood from a consideration of the following description in conjunction with the accompanying drawings in which:

Fig. 1 is a plan of a removable unit for use in automobiles;

Fig. 2 is an elevation of the unit shown in Fig. 1, and showing, in addition, a portion of a seat attached directly to the supporting frame;

Fig. 3 is a sectional elevation taken substantially along line 3—3 of Fig. 1, but showing, in addition, a portion of a seat attached to the supporting frame;

Fig. 4 is a sectional elevation taken substantially along line 4—4 of Fig. 1, but showing, in addition, means for attaching a seat to the supporting frame;

Fig. 5 is a sectional elevation taken substantially along line 5—5 of Fig. 1, but showing, in addition, a seat attached directly to the supporting frame;

Fig. 6 is a sectional elevation taken substantially along line 6—6 of Fig. 1;

Fig. 7 is a sectional elevation taken substantially along line 7—7 of Fig. 5 and showing an operating lever in the form of a ratchet mechanism;

Fig. 8 is a sectional elevation similar to that shown in Fig. 3, but showing cushioning members disposed between the seat and supporting frame; and Fig. 9 is a sectional elevation taken substantially along line 9—9 of Fig. 8.

The apparatus shown in the drawings comprises a supporting frame 10 supported at its opposite ends in guides 11. The guides 11 comprise upper and lower sheet metal plates 12 and 13 lying in contact with each other adjacent the center and at one side and attached to the floor board unit or base 14 by means of bolts 15. The guide plates may be riveted or otherwise attached together at one or more points between the bolts 15. The upper plates 12 are provided with upstanding longitudinally extending flanges which serve as strengthening ribs. The central portion of each upper plate 12 is pressed downwardly to form a groove and each lower plate 13 is pressed upwardly along the outside edge so that its upper surface lies in contact with the lower surface of the upper plate 12. The inner edge portions of the upper and lower plates 12 and 13 are spaced apart to provide a groove for the reception of the end portions of the supporting frame 10. The floor unit 14 comprises five separate boards held together by means of wood cleats attached to their bottom surfaces and extending transversely of the guides. A rectangular section is removed from an edge portion of one board to provide an opening 18 between two adjacent boards. The bolts 15 extend through boards which are spaced apart a distance at least equal to the width of one board and the lower plates 13 are pressed out so that the portions around the holes through which the bolts 15 extend project below the major portion of the lower surface and the guides are supported by the boards through which the bolts extend and are normally spaced above the intermediate boards. The guides 11 are similar and interchangeable.

The frame 10 comprises two similar sheet metal side members 16 and two similar sheet metal end members 17. The end members 17 are disposed above and rest upon the side members 16 and the side and end members are held in proper alignment by means of tongues 20 struck from the side members 16 and extending into slots in the end members 17, and by means of downwardly pressed portions 21 of the end members 17. Additional means in the form of seat bolts 22 attached to and extending through the side members 16 and engaging the walls of slots formed in the end members 17 may be provided for holding the side and end members in alignment. The outer edge portions of the end members 17 between the side members 16 are pressed down into substantial alignment with the outer ends of the side members 16 and these portions extend with the outer ends of the side members 16 into the grooves formed by the upper and lower guide plates 12 and 13. The side and end members 16 and 17 may be riveted together as at 23. The end edges of the frame 10 are spaced from the vertical walls of the grooves in the guides, and preferably lie in contact only with the inner side edges of the upper surface of the guide plate 13. The end members 17 are provided with holes 19 which provide means for attaching cushioning members thereto. The portions of the side members 16 adjacent the seat bolts 22 are pressed out to provide supporting surfaces for the seat attaching members at the same elevation as the upper surfaces of the end members 17, as shown, for instance, in Fig. 6.

A sheet metal rack plate 24, having rack teeth formed therein by pressing, is mounted on and rigidly attached to the side members 16 between these members and the floor boards and extends parallel with the guides 11. The longitudinal edge portions of the rack plate 24 are bent to provide upstanding flanges which are disposed in grooves formed in a plate 25 as shown, for instance, in Fig. 3. The plate 25 extends over the opening 18 in the floor board unit and is attached by means of bolts 26 extending through the floor boards to a housing 27 containing a worm 30.

The worm 30 is mounted on a shaft 31 supported for rotation in suitable bearings in the end walls of the housing 27. Suitable thrust bearings are provided for engaging the end faces of the worm 30. A seat 32 may be attached directly to the frame 10 by means of bolts 22 and wood cleats 28 extending longitudinally thereof. The shaft 31 extends beneath the floor boards to a point in front of the seat 32, and it is supported at its forward end in a bearing 33 comprising a suitable bent strap of sheet metal. The forward end of the shaft 31 is provided with an operating lever 34. The floor board unit is provided with a semi-circular opening adjacent the outer end of the operating lever 34 to permit access thereto. A spring clip 38 locks the lever 34 against rotation.

The operating lever 34 comprises a casing having a handle portion and an enlarged end portion for receiving a ratchet wheel 35. The ratchet wheel 35 is preferably rigidly mounted on the shaft 31. A ratchet pawl 36 is pivotally attached between its ends to a wall of the casing for reversing movement. A reversing lever 37 extends through the handle portion of the casing and is pivotally attached to the pawl. The reversing lever 37 is provided with a projection 40 which extends through a slot in the casing wall to permit manipulation. A spring 41 is provided for maintaining the pawl in engagement with the ratchet wheel. The lever 37 may be manipulated to cause either end of the ratchet pawl to engage the ratchet wheel so that the operating lever 34 may be utilized for rotating the worm shaft in opposite directions. The operating lever is preferably so formed that its upper edge lies flush with or slightly below the upper surface of the floor boards when not in use.

In Figs. 8 and 9 cushioning members 42 are shown disposed between the seat and the supporting frame. Each cushioning member comprises a pair of channel-shaped sheet metal members 43 attached together at their end edges by means of bolts 44 to form an annular ring. An annular soft rubber core 45 is seated within the annular ring thus formed between the side walls of the channel-shaped members, and an annular sheet metal core 46 having a grooved outer surface is mounted within the opening in the rubber core. The rubber core may be conveniently formed of two U-shaped members.

One of the channel-shaped members 43 is attached to each of the end members 17 of the supporting frame 10. A sheet metal plate 47 is attached at one end to the inner sheet metal core 46 and at its opposite end to the attaching members 48 carried by the seat 49. The upper and lower channel-shaped members 43 are held in fixed positions relatively to one another by means of shims 50 at their ends, and by means of a centrally disposed sleeve 51 and a bolt 52. The attaching members 48 are formed of wood and extend longitudinally of the seat.

A seat mounted on the supporting frame 10 may be moved in either direction longitudinally of the body of an automobile in which it may be mounted through proper manipulation of the operating lever 34. The plate 25, contacting with the upstanding flanges on the rack plate 24, serves as a guide for the frame 10 and confines it to its proper path of travel, thus preventing side movement of the frame with resulting jamming.

The plate 25 may also serve to prevent vertical movement of the frame. Portions of the plate between the center and the grooved portions overlying the upstanding flanges on the rack plate may be bent downwardly to provide curved surfaced ridges in contact with the upper surface of the rack plate. This structure is illustrated in Fig. 3.

Portions of the end plates 17 of the supporting frame may lie in contact with the inner upstanding flanges on the upper guide plates 12 and these flanges are preferably bent to provide curved contacting surfaces. The contacting surfaces between moving parts are preferably curved to provide minimum contact areas and eliminate friction.

Apparatus constructed in accordance with the invention is simple, efficient and relatively inexpensive to manufacture. Many of the parts are interchangeable and of such natures that they may be formed without waste. The supporting structure is capable of efficiently supporting a double seat so that the entire front seat of an automobile may be made adjustable. The adjustable supporting means may be attached to the floor board unit before the floor board unit is placed in the automobile, and the seat proper may be attached to the adjustable supporting means after the assembly has been placed in the automobile.

I claim:

1. A device of the class described comprising a fixed support, spaced guides mounted upon said support, a seat support adjustably mounted upon said guides, a rack mounted upon said seat support and movable therewith, a worm disposed below and engaging said rack, a housing surrounding said worm, and a guiding and restraining member extending over said rack and rigidly attached to said housing and said fixed support.

2. In a device of the class described, an adjustable seat support, a rack rigidly attached to said seat support, screw means including a worm engaging said rack to move said support, a housing surrounding said screw means, and a plate extending over said rack and rigidly attached to said support and said housing to guide said rack and restrain movement of the rack away from the worm.

3. In an automobile, a pair of spaced guides mounted upon the floor thereof, a movable seat support mounted upon said guides, a rack attached to said support and movable therewith, a shaft rotatably mounted below the floor, a worm rigidly mounted on said shaft and extending through an opening in the floor into engagement with said rack, a housing surrounding said worm, and a metal strap extending over said rack and rigidly attached to said housing.

4. In an automobile, a pair of spaced guides mounted upon the floor thereof, a movable seat support mounted upon said guides, a rack rigidly attached to said seat support and movable therewith, a worm mounted for rotation beneath the floor and extending through an opening in the floor into engagement with said rack, means for rotating said worm to move said rack and support, a housing surrounding said worm and provided with thrust bearings for engaging the end faces of said worm, and a plate extending over said rack and rigidly attached to the floor and housing to guide said rack and restrain movement of the rack away from the worm.

In testimony whereof I affix my signature.

GERHARD FLINTERMANN.